United States Patent
Krause et al.

(10) Patent No.: US 9,046,890 B2
(45) Date of Patent: Jun. 2, 2015

(54) LINE TRACKING DATA OVER ETHERNET

(75) Inventors: Kenneth W. Krause, Rochester Hills, MI (US); Jim Huber, Rochester Hills, MI (US); Ho Cheung Wong, Troy, MI (US); Randy Graca, Macomb, MI (US); Scott J. Clifford, Rochester Hills, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 1263 days.

(21) Appl. No.: 12/205,165

(22) Filed: Sep. 5, 2008

(65) Prior Publication Data

US 2010/0063625 A1  Mar. 11, 2010

(51) Int. Cl.
  *G06F 7/00*   (2006.01)
  *G06F 19/00*  (2011.01)
  *G05B 19/04*  (2006.01)
  *G05B 19/418* (2006.01)

(52) U.S. Cl.
  CPC .. *G05B 19/4182* (2013.01); *G05B 2219/31432* (2013.01)

(58) Field of Classification Search
  CPC .......... G05B 19/4182; G05B 2219/37138; G05B 2219/40323; G05B 2219/40554; G05B 2219/31034; G05B 2219/39102; G05B 2219/31312; G05B 2219/45083; B25J 18/00; B25J 9/1671; B25J 9/1697; B25J 9/0093
  See application file for complete search history.

(56) References Cited

U.S. PATENT DOCUMENTS

| | | | | |
|---|---|---|---|---|
| 4,181,947 A | * | 1/1980 | Krauss et al. | 700/223 |
| 4,338,672 A | * | 7/1982 | Perzley et al. | 700/249 |
| 4,766,547 A | * | 8/1988 | Modery et al. | 700/229 |
| 5,479,352 A | * | 12/1995 | Smith | 700/95 |
| 5,969,339 A | * | 10/1999 | McMurray et al. | 250/223 R |
| 6,535,926 B1 | | 3/2003 | Esker | |
| 6,801,828 B2 | * | 10/2004 | Chapple et al. | 700/122 |
| 6,804,580 B1 | * | 10/2004 | Stoddard et al. | 700/248 |
| 7,020,532 B2 | | 3/2006 | Johnson et al. | |
| 7,149,606 B2 | * | 12/2006 | Krause | 700/306 |
| 7,991,505 B2 | * | 8/2011 | Lert et al. | 700/214 |
| 2004/0151363 A1 | * | 8/2004 | Villain | 382/151 |
| 2006/0217841 A1 | | 9/2006 | Matsumoto et al. | |
| 2006/0287769 A1 | | 12/2006 | Yanagita et al. | |
| 2007/0010898 A1 | | 1/2007 | Hosek et al. | |
| 2007/0073439 A1 | * | 3/2007 | Habibi et al. | 700/213 |
| 2008/0288109 A1 | * | 11/2008 | Tao et al. | 700/255 |

* cited by examiner

*Primary Examiner* — Bao Long T Nguyen
(74) *Attorney, Agent, or Firm* — Fraser Clemens Martin & Miller LLC; William J. Clemens

(57) ABSTRACT

A robot control system includes a line tracking encoder that measures a reference position of a conveyor line and transmits a tracking signal representing tracking data including the reference position of the conveyor line. A master controller is in communication with the encoder to receive the tracking signal, process the tracking data represented by the tracking signal, and generate a data packet in response to processing of the tracking data. A slave controller is in communication with the master controller and at least one robot for receiving the data packet and controlling the movement of the at least one robot in response to the data packet. A communications network directly interconnects the master controller and the slave controller and transmits the data packet from the master controller to the slave controller.

9 Claims, 2 Drawing Sheets

LINE TRACKING DATA OVER ETHERNET

FIELD OF THE INVENTION

The invention relates to robotics. More particularly, the invention is directed to a robot control system and method for controlling movements of a plurality of robots.

BACKGROUND OF THE INVENTION

It is common, when working with conveyor controls, automation or robotic systems, to synchronize the operation to the conveyor. This practice is generally referred to as "line-tracking" and is accomplished by coupling an encoding device to the conveyor. The encoder generates a frequency or position reference which is processed by the automation or robot controller.

Currently, line-tracking systems share data received from the encoder via a system of multiplexers and inputs into each robot controller. However, multiplexing the encoder inputs is expensive and involves special wiring. Further, systems relying upon multiplexers are limited in the number of robots controlled by the system as a result of the limited number of multiplexer outputs. Additionally, the position reference provided by the encoders is quickly obsolete as the conveyor line continues to move.

Other line-tracking systems require a separate intervening computer in communication with the controllers for distributing the received data from the encoders. Typically, such systems include specialized Ethernet hardware for maintaining timing information relating to the distributed data and control of the robots. The intervening computer and specialized Ethernet hardware increases the over-all cost of the line-tracking system while increasing the chance of field failure.

It would be desirable to have a control system and a method for controlling movements of a plurality of robots, wherein the control system provides an inexpensive and accurate tracking of the position of the conveyor, while controlling of the movements of the robots in response to the line-tracking.

SUMMARY OF THE INVENTION

Concordant and consistent with the present invention, a control system and a method for controlling movements of a plurality of robots, wherein the control system provides an inexpensive and accurate tracking of the position of the conveyor, while controlling the movements of the robots in response to the line-tracking, has surprisingly been discovered.

In one embodiment, a control system comprises: a line tracking encoder adapted to measure a reference position of a conveyor line and transmit a tracking signal representing tracking data including the reference position of the conveyor line; a master controller in communication with the encoder, the master controller adapted to receive the tracking signal, process the tracking data represented by the tracking signal, and generate a data packet in response to processing of the tracking data; a slave controller in communication with the master controller and in electrical communication with at least one robot, the slave controller adapted to receive the data packet and control the movement of the at least one robot in response to the data packet; and a communications network directly interconnecting the master controller and the slave controller, wherein the communications network is adapted to transmit the data packet from the master controller to the slave controller.

The invention also provides methods for controlling movements of a plurality of robots.

One method comprises the steps of: measuring a reference position of a conveyor line; transmitting a tracking signal representing a tracking data including the reference position of the conveyor line; processing the tracking data represented by the tracking signal; generating a data packet in response to the processing of the tracking data; transmitting the data packet over a communications network; processing the data packet to predict a position of the conveyor line; and controlling a movement of at least one robot in response to the processing of the data packet.

Another method comprises the steps of: providing a control system including: a line tracking encoder adapted to measure a reference position of a conveyor line and transmit a tracking signal representing tracking data including the reference position of the conveyor line; a master controller in communication with the encoder, the master controller adapted to receive the tracking signal, process the tracking data represented by the tracking signal, and generate a data packet in response to processing of the tracking data; a slave controller in communication with the master controller and in electrical communication with at least one robot; and a communications network directly interconnecting the master controller and the slave controller; transmitting the data packet over the communications network to the slave controller; and controlling a movement of the at least one robot in response to the data packet.

BRIEF DESCRIPTION OF THE DRAWINGS

The above, as well as other, advantages of the present invention will become readily apparent to those skilled in the art from the following detailed description of exemplary embodiments of the invention when considered in the light of the accompanying drawings.

DETAILED DESCRIPTION OF EXEMPLARY EMBODIMENTS OF THE INVENTION

The following detailed description and appended drawing describe and illustrate various embodiments of the invention. The description and drawing serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
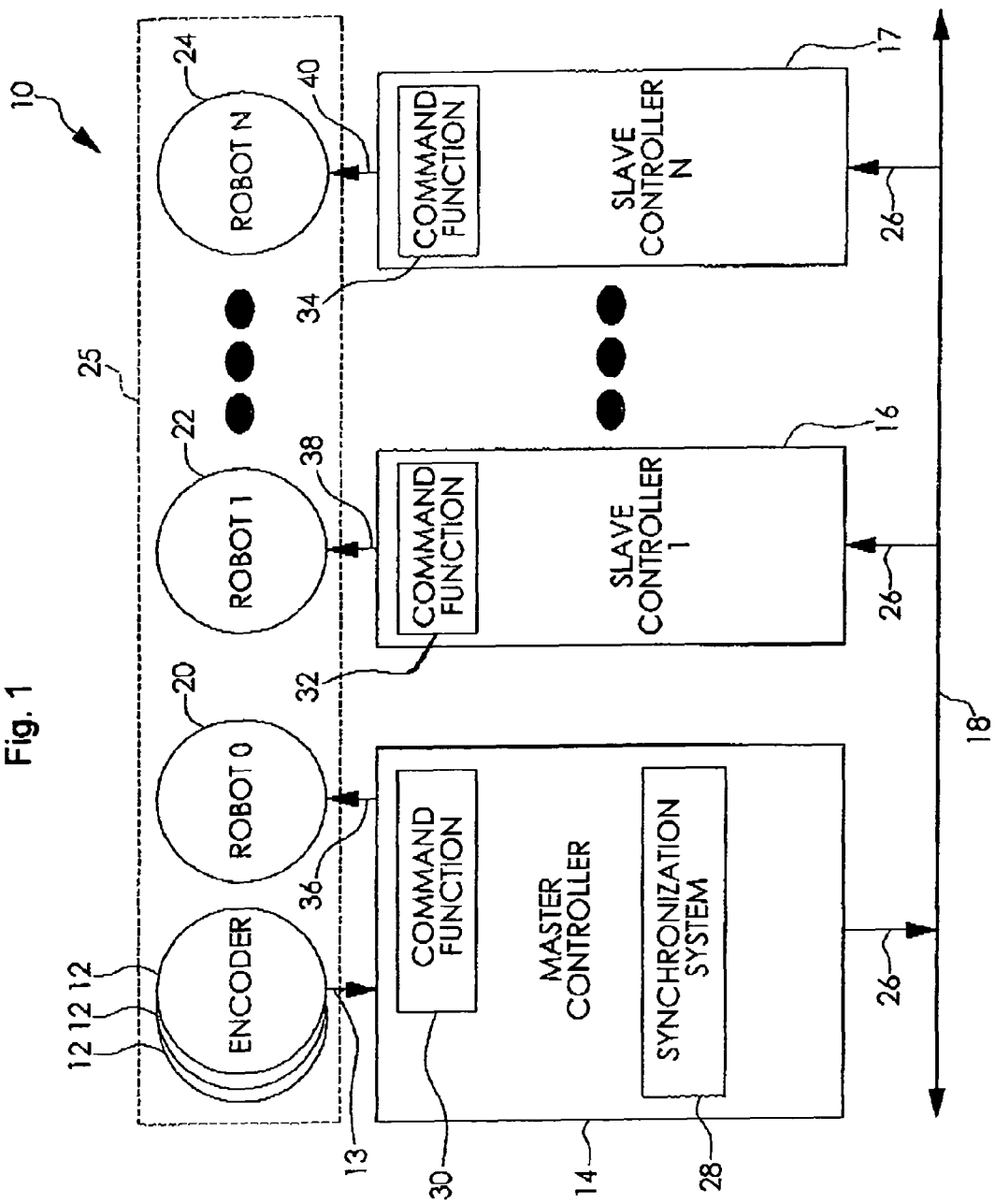
FIG. 1 is a schematic diagram of a control system according to an embodiment of the present invention.

Referring to the FIG. 1, there is illustrated a control system 10 according to an embodiment of the present invention. The control system 10 includes a plurality of encoders 12, a master controller 14, a number "N" of slave controllers 16, 17, and a communications network 18. Although the FIG. 1 illustrates the control system 10 in which each of the controllers 14, 16, 17 communicates with one robot 20, 22, 24 respectively, each controller 14, 16, 17 may communicate with two or more robots, as desired. Movement of the robots 20, 22, 24 associated with the respective controllers 14, 16, 17 is controlled by a plurality of robot commands 36, 38, 40, for example, in the form of electronic signals that issue from each controller 14, 16, 17 and are sent to the associated robots 20, 22, 24. Although the invention is discussed with reference to a robotic control system 10, the invention can be applied to the control of other kinds of actuators, that react in response to commands issuing from multiple controllers, each of which controls at least one such actuator.

The encoders 12 may be any device adapted to provide accurate position tracking of a conveyor line 25 at a specified design resolution. Specifically, the encoders 12 are each adapted to measure a reference position of the conveyor line 25 and transmit a tracking signal 13 representing tracking data including the reference position value of the conveyor line. Other data and information may be included, as desired. As a non-limiting example, an initiation of the tracking signal 13 transmission is based on at least one of a displacement or rotation of the encoders 12, a displacement of the conveyor line 25, or a count of items travelling on the conveyor line 25. Other means of initiating the transmission of the tracking signal 13 may be used, as appropriate. It is understood that the encoders 12 may have any size, resolution, and additional functionality, as desired. It is further understood that any number of encoders 12 may be used, as desired.

The master controller 14 is in communication with the encoders 12 and the communications network 18. The master controller 14 is adapted to receive the tracking signal 13 from at least one of the encoders 12, process the tracking data represented by the tracking signal 13, and transmit a data packet 26 in response to the processing of the tracking data. It is understood that the generation of the data packet 26 may be a direct result of the processing of the tracking data. It is further understood that additional processing and calculations may be included in the generation of the data packet 26. In certain embodiments, the tracking data includes the reference position value measured by at least one of the encoders 12. The master controller 14 is adapted to record a plurality of the received reference position values and calculate a velocity of the conveyor line 25 based upon the plurality of reference position values measured by the encoders 12. In certain embodiments, the master controller 14 is adapted to predict a future position of the conveyor line 25 based upon the received reference position values of the conveyor line 25 and the calculated velocity value of the conveyor line 25. It is understood that the prediction function of the master controller 14 may be an extrapolation of the future position values of the conveyor line 25 based upon the received reference position values of the conveyor line 25 and the calculated velocity value of the conveyor line 25. It is further understood that other functions may be used to determine a future position of the conveyor line 25 such as interpolation of data and algorithms, for example. The master controller 14 is further adapted to compare the predicted position of the conveyor line 25 with the reference position value, wherein the predicted position value has a pre-determined tolerance. It is understood that the tolerance represents a permissible limit of variation from the predicted position value. It is further understood that the tolerance may be modified, as desired.

As shown, the master controller 14 includes a synchronization system 28. The synchronization system 28 is adapted to receive the tracking data represented by the tracking signal 13 and tag each of the tracking data values with a network tick time tag. The time tag provides a time reference representing when the tracking data was received. As a non-limiting example, the synchronization system 28 time tags each reference position value with a network tick time tag when the reference position values are received from the encoders 12 and recorded by the master control 14, thereby establishing the time each reference position value was received and recorded. A similar synchronization system and methods for synchronization are described in U.S. Pat. No. 7,149,606, hereby incorporated herein by reference in its entirety.

In cooperation, the master controller 14 and the synchronization system 28 are adapted to establish the position value for the conveyor line 25, the tick time value for the position value, and the velocity value for the conveyor line 25. It is understood that additional components may be included for carrying out the processing functions of the master controller 14. It is also understood that the functions and processing of the master controller 14 may be pre-programmed or modified for desirable results.

The slave controllers 16, 17 are in communication with the communications network 18. The slave controllers 16, 17 are each adapted to receive the data packet 26 transmitted by the master controller 14, process the data packet 26, and control the movements of the associated robots 22, 24 in response to the processing of the data packet 26. In certain embodiments, the data packet 26 includes at least one of the reference position values for each of the encoders 12, the tick time value for each of the reference position values, and the velocity value for the conveyor line 25. The slave controllers 16, 17 are also adapted to predict the future position of the conveyor line 25 based upon the received information in the data packet 26, thereby providing an accurate position of the conveyor line 25 between receiving updated data packets 26. It is understood that the slave controllers 16, 17 may include additional components, as desired.

The communications network 18 is adapted to provide a direct data interconnection between the master controller 14 and the slave controllers 16, 17. As a non-limiting example, the communications network 18 is a single Ethernet cable. However, other appropriate means of direct communication may be used, as desired.

In use, the master controller 14 receives the line tracking signal 13 from at least one of the encoders 12. The tracking data represented by the tracking signal 13 is time tagged with the network tick by the synchronization system 28. In certain embodiments, the tracking data includes the reference position values of the conveyor line 25. As such, the reference position values received from the encoders 12 are each time tagged for later processing. As a non-limiting example, the velocity of the conveyor line 25 is determined over a number of the time tagged reference position values received from the encoders 12. Specifically, the velocity of the conveyor line 25 may be determined from the number of counts or tracking signals 13 received from the encoders 12 over a pre-determined period of time. Other methods of determining the velocity of the conveyor line 25 may be used, as desired. In certain embodiments, a reference position value having a particular time tag is compared to the predicted position determined by the master controller 14 in light of the pre-determined tolerance. Where the reference position at a pre-determined time is in tolerance with the predicted position, no updated data packet 26 is sent to the slave controllers 16, 17. Where the reference position is not in tolerance with the predicted position for the particular time tag, the updated data packet 26 is transmitted across the communications network 18 to the slave controllers 16, 17. As such, the slave controllers 16, 17 receive the updated data packet 26 including at least one of the reference position values, the network tick time tags for the reference position values, and the velocity information for the conveyor line 25. The slave controllers 16, 17 process the updated data packet 26 and calculate a predicted future position of the conveyor line 25 based upon the information contained in the updated data packet 26. As such, each of the controllers 14, 16, 17 has a command function 30, 32, 34, which produces the robot commands 36, 38, 40 respectively. The command functions 30, 32, 34 are mutually independent and execute robot control programs, which are sequences of commands that instruct the robots under control of one of the controllers 14, 16, 17 to move to specific locations. Accordingly, the command function 30, 32, 34 is modified in response to the processing of the data packet 26 and the predication of the future position values of the conveyor line 25 by the master controller 14 and the slave controllers 16, 17.

The control system 10 provides a simple and direct communications link between the master controller 14 and the slave controllers 16, 17, thereby providing a cost-effective means to share the time-tagged position data of the conveyor line 25, without additional intervening computers, multiplexers, or specialized Ethernet hardware for maintaining timing information. Accordingly, the control system 10 provides an inexpensive and efficient means for tracking the position of the conveyor line 25 and controlling the movements of the robots 20, 22, 24 based upon a prediction of the future position of the conveyor line 25.

Figure 2:
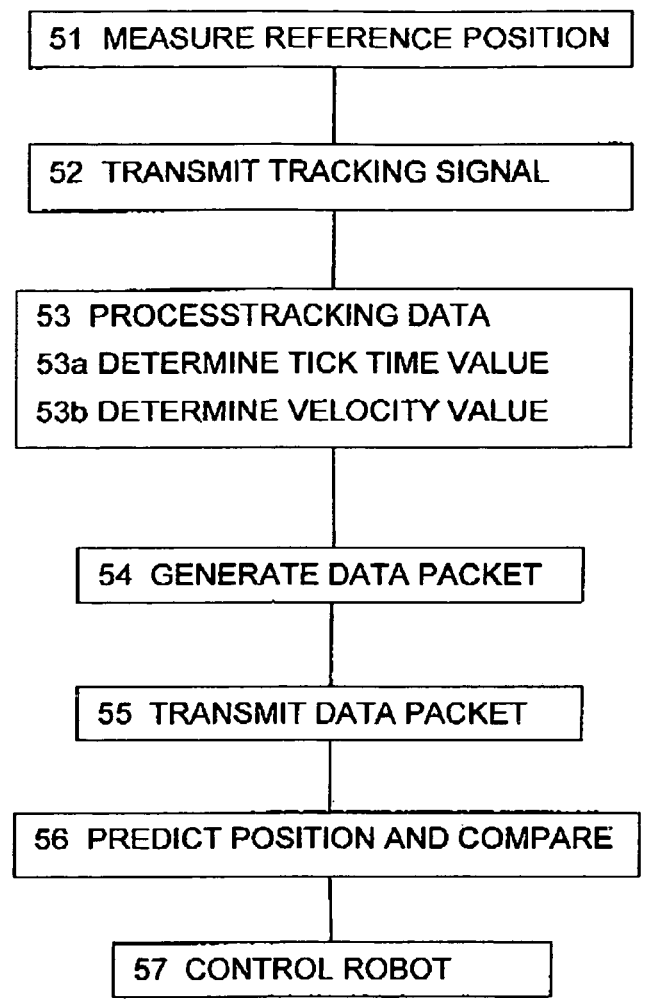
FIG. 2 is a flow diagram of a method for controlling according to an embodiment of the present invention.

There is shown in FIG. 2 a flow diagram of a method according to an embodiment of the present invention. The method 50 relates to controlling movements of a plurality of robots and begins with a step 51 of measuring a reference position of the conveyor line 25 (FIG. 1). The next step 52 involves transmitting a tracking signal representing tracking data including the reference position of the conveyor line. A processing of the tracking data represented by the tracking signal is performed in a step 53. The processing of the tracking data includes the step 53a of determining a tick time value for the reference position of the conveyor line and the step 53b of determining a velocity value of the conveyor line. The next step 54 involves generating a data packet in response to the processing of the tracking data in the step 53. The data packet includes at least one of the reference position of the conveyor line, the tick time value for the reference position of the conveyor line, and the velocity value of the conveyor line. Next, there is performed a step 55 of transmitting the data packet over the communications network 18 that can be an Ethernet network. A step 56 involves processing the data packet to predict a future position of the conveyor line and comparing the predicted future position of the conveyor line with a reference position within a pre-determined tolerance range. Finally, a step 57 is performed for controlling a movement of at least one robot 20, 22, 24 in response to the processing of the data packet.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A control system, comprising:
a line tracking encoder adapted to measure a reference position of a conveyor line and transmit a tracking signal representing tracking data including the reference position of the conveyor line as a plurality of reference position values;
a master controller in communication with and not including said line tracking encoder, said master controller adapted to receive said tracking signal, said tracking data represented by said tracking signal, said master controller adapted to record the plurality of the received reference position values included in said tracking signal and calculate a velocity value of the conveyor line from the reference position values, and said master controller adapted to generate a data packet in response to processing of said tracking data, said data packet including one of the reference position values, the velocity value of the conveyor line and a tick time value for the one reference position value, said master controller being in electrical communication with an at least one robot for controlling movement of said at least one robot in response to the reference position values and the velocity value;
a slave controller in communication with said master controller and in electrical communication with at least another robot, said slave controller adapted to receive said data packet and control movement of said at least another robot in response to said data packet; and
a communications network directly interconnecting said master controller and said slave controller, wherein said communications network is adapted to transmit said data packet from said master controller to said slave controller, wherein said slave controller predicts a future position of the conveyor line from said data packet previously received and compares the predicted future position with the one reference position value, and when the predicted future position differs from the one reference position value by more than a predetermined tolerance range, said slave controller modifies a command function for moving said at least another robot.

2. The control system according to claim 1 wherein said master controller includes a synchronization system to time tag said tracking data.

3. The control system according to claim 1 wherein said communications network is an Ethernet network.

4. A control system, comprising:
a line tracking encoder adapted to measure a reference position of a conveyor line and transmit a tracking signal representing tracking data including the reference position of the conveyor line;
a master controller in communication with said encoder, said master controller adapted to receive said tracking signal, process said tracking data represented by said tracking signal, and generate a data packet in response to processing of said tracking data, said master controller being in electrical communication with an at least one robot for controlling movement of said at least one robot;
a slave controller in communication with said master controller and in electrical communication with at least another robot, said slave controller adapted to receive said data packet and control movement of said at least another robot in response to said data packet; and
a communications network directly interconnecting said master controller and said slave controller,
wherein said communications network is adapted to transmit said data packet from said master controller to said slave controller,
wherein processing of said tracking data comprises the steps of:
determining the reference position of the conveyor line;
determining a tick time value for the reference position; and
determining a velocity value of the conveyor line,
wherein said master controller is adapted to predict a future position of the conveyor line in response to processing of said tracking data,
wherein said master controller is adapted to compare the predicted future position of the conveyor line with the reference position within a pre-determined tolerance range, and
wherein said data packet is an updated data packet and said updated data packet is transmitted only when the reference position value is not in within the tolerance range of the predicted future position calculated by said master controller.

5. A method for controlling movements of a plurality of robots, the method comprising the steps of:

measuring a reference position of a conveyor line;

transmitting a tracking signal representing tracking data including a plurality of reference position values of the reference position of the conveyor line to a master controller controlling movement of at least one robot, the master controller not including a line tracking encoder, and the master controller adapted to record a plurality of the received reference position values included in the tracking signal;

processing the tracking data represented by the tracking signal with the master controller to calculate a velocity value of the conveyor line from the reference position values;

generating a data packet with the master controller in response to the processing of the tracking data, the data packet including one of the reference position values, the velocity value and a tick time value for the one reference position value;

transmitting the data packet over a communications network from the master controller to a slave controller;

processing the data packet with the slave controller; and controlling a movement of at least another robot with the slave controller in response to the processing of the data packet, wherein the slave controller predicts a future position of the conveyor line from the data packet previously received and compares the predicted future position with the one reference position value, and when the predicted future position differs from the one reference position value by more than a predetermined tolerance range, said slave controller modifies a command function for moving the at least another robot.

6. The method according to claim 5 wherein the communications network is an Ethernet network.

7. A method for controlling movements of a plurality of robots, the method comprising the steps of:

providing a control system including, a line tracking encoder adapted to measure a reference position of a conveyor line and transmit a tracking signal representing tracking data including a plurality of reference position values for the reference position of the conveyor line, and a master controller in communication with the encoder, the master controller not including the line tracking encoder, the master controller adapted to receive the tracking signal, process the tracking data represented by the tracking signal, the master controller adapted to record the plurality of the received reference position values included in said tracking signal and calculate a velocity value of the conveyor line from the reference position values, and the master controller adapted to generate a data packet in response to processing of the tracking data, the data packet including one of the reference position values, the velocity value of the conveyor line and a tick time value for the one reference position value, the master controller being in electrical communication with at least one robot for controlling movement of the at least one robot in response to the reference position values and the velocity value;

providing a slave controller in communication with the master controller and in electrical communication with at least another robot; and a communications network directly interconnecting the master controller and the slave controller;

transmitting the data packet over the communications network to the slave controller; and controlling a movement of the at least another robot in response to the data packet, wherein the slave controller predicts a future position of the conveyor line based upon the one reference position value and the velocity value included in the data packet previously received and compares the predicted future position of the conveyor line with a reference position within a pre-determined tolerance range, and when the predicted future position differs from the one reference position value by more than a predetermined tolerance range, the slave controller modifies a command function for moving the at least another robot.

8. The control system according to claim 7 wherein the master controller includes a synchronization system to time tag the tracking data.

9. The method according to claim 7 wherein the communications network is an Ethernet network.

* * * * *